United States Patent

Xie et al.

[11] Patent Number: 5,874,994
[45] Date of Patent: Feb. 23, 1999

[54] FILTER EMPLOYING ARITHMETIC OPERATIONS FOR AN ELECTRONIC SYCHRONIZED DIGITAL CAMERA

[75] Inventors: Don X. Xie; Kenneth A. Parulski, both of Rochester, N.Y.

[73] Assignee: Eastman Kodak Company, Rochester, N.Y.

[21] Appl. No.: 568,882

[22] Filed: Dec. 11, 1995

[51] Int. Cl.$^6$ ............. H04N 5/232; H04N 5/335
[52] U.S. Cl. ............. 348/349; 348/234; 348/273; 348/355; 348/614; 364/724.13; 364/724.17
[58] Field of Search ............. 396/101; 364/724.13, 364/724.17; 348/207, 222, 234, 235, 237, 266, 272, 280, 345, 349, 353, 354, 355, 356, 273, 571, 614, 620, 720; H04N 5/232, 5/213, 5/217, 5/335

[56] References Cited

U.S. PATENT DOCUMENTS

| | | | |
|---|---|---|---|
| 3,971,065 | 7/1976 | Bayer | 358/41 |
| 4,467,440 | 8/1984 | Sano et al. | 364/724 |
| 4,975,726 | 12/1990 | Kuga et al. | 354/402 |
| 4,985,777 | 1/1991 | Kawada | 358/227 |
| 4,991,010 | 2/1991 | Hailey et al. | 358/140 |
| 5,070,353 | 12/1991 | Komiya et al. | 354/402 |
| 5,115,262 | 5/1992 | Komiya | 354/402 |
| 5,122,718 | 6/1992 | Sawata | 318/621 |
| 5,144,450 | 9/1992 | Kikuchi et al. | 358/227 |
| 5,251,019 | 10/1993 | Moorman et al. | 358/44 |
| 5,260,736 | 11/1993 | Toji | 354/402 |
| 5,325,146 | 6/1994 | Toji | 354/402 |
| 5,337,084 | 8/1994 | Nakamura | 348/345 |
| 5,345,264 | 9/1994 | Murata et al. | 348/235 |
| 5,367,476 | 11/1994 | Elliott | 364/724.07 |
| 5,369,436 | 11/1994 | Kawakami et al. | 348/355 |
| 5,581,357 | 12/1996 | Sasaki et al. | 348/235 |

FOREIGN PATENT DOCUMENTS

Sho 501975-158327  12/1975  Japan .................. G02B 7/11

OTHER PUBLICATIONS

Jun'ichi Ishida and Yasushi Fujimura, "Automatic focus adjustment for TV cameras by hill–climbing servomechanism", NHK Sogo Gitutsu Kenkyujo, vol. 17, No. 1.

Primary Examiner—Wendy Garber
Assistant Examiner—Ngoc-Yen Vu
Attorney, Agent, or Firm—David M. Woods

[57] ABSTRACT

An electronic imaging apparatus includes an optical system and a digital filter for providing focus values for focusing the optical system upon a color image sensor. The color image sensor, which operates at a pixel clock frequency to provide image data, has a repeatable color pattern including a luminance color which recurs at a predetermined repetition rate that is a submultiple of the pixel clock frequency. The digital filter includes a plurality of filter coefficients that are applied to the image data in groups of coefficients to implement a digital bandpass filter function. In particular, an arrangement of processing elements performs a sequence of multiplications upon the input data, each multiplication generating an output value dependent upon the value of a coefficient applied to a corresponding processing element. An arrangement of multiplexers sequentially apply the groups of coefficients to the arrangement of processing elements in synchronism with a submultiple of the pixel clock frequency, e.g., in synchronism with the predetermined repetition rate. By feeding the output of the processing arrangement back to its input, the focus values output by the filter are obtained at the predetermined repetition rate. Thus, by utilizing the repeatability of the color pattern, the digital filter may be designed with usage of fewer components.

19 Claims, 10 Drawing Sheets

CCD LINES

| | | | | | | | |
|---|---|---|---|---|---|---|---|
| LINE 1 | G | R | G | R | G | R | G | R |
| LINE 2 | B | G | B | G | B | G | B | G |
| LINE 3 | G | R | G | R | G | R | G | R |
| LINE 4 | B | G | B | G | B | G | B | G |
| LINE 5 | G | R | G | R | G | R | G | R |
| LINE 6 | B | G | B | G | B | G | B | G |
| LINE 7 | G | R | G | R | G | R | G | R |
| LINE 8 | B | G | B | G | B | G | B | G |

FILTER EMPLOYING ARITHMETIC
OPERATIONS FOR AN ELECTRONIC
SYCHRONIZED DIGITAL CAMERA

FIELD OF THE INVENTION

The invention relates generally to the field of electronic photography, and in particular to a digital filter design for an electronic camera.

BACKGROUND OF THE INVENTION

A conventional auto-focus system for a video camera is described in an article entitled "Automatic focus adjustment for TV cameras by hill-climbing servomechanism", by J. Ishida and Y. Fujimura, NHK Technical Research, Vol. 17, No. 1, 1965, pp. 21–37. This system uses what is often referred to as "contrast autofocus", where the lens focus position is adjusted automatically until the contrast of the edge detail in the image, or a particular area of the image, is maximized. This type of autofocus is also known as "hill climbing" autofocus because it generates a sequence of values that increase in level until they pass over a peak, i.e., a "hill".

In order to increase focusing response time without sacrificing focusing precision, it is common to use not only the higher frequency component of the video signal, but also the lower frequency component. For example, in Japanese patent application no. 50-158327, published Dec. 22, 1975, a lens is quickly driven in coarse adjustment steps in a low frequency range furthest from the maximum focus, and then driven in finer adjustment steps in a high frequency range nearer to the maximum focus.

FIG. 1 shows a known infinite impulse response (IIR) filter block diagram useful in the known types of autofocus systems to isolate either a higher frequency component or a lower frequency component of a signal. This IIR filter includes ten multipliers 2-1 to 2-10 which generate the output signal. The filter function is obtained by each multiplier implementing a coefficient unique to the particular digital filter function, thereby providing the particular frequency characteristic of the filter. The ten coefficients are applied to the input signal, which is suitably delayed by four delay elements 4-1 to 4-4. The multiplied values are then summed in four summers 6-1 to 6-4, and then output as the filtered signal.

While the coefficient values implemented by the multipliers 2-1 to 2-10 remain the same for all the pixels of an image, the values may be programmed differently for different images, or for different passes through the same image. For example, FIGS. 2 and 3 show two different bandpass filter characteristics which can be implemented by programming different coefficients. FIG. 2 shows a lower frequency bandpass filter characteristic, which could be used to implement the coarse adjustment described in the aforementioned Japanese patent application 50-158327. Similarly, the finer adjustment described in that application could be implemented by programming the filter coefficients to provide the higher frequency bandpass filter characteristic shown in FIG. 3. Another example of filter switching at the image level is shown in U.S. Pat. No. 4,975,726, where filter coefficients are switched as the image luminance or the camera aperture is changed.

A flow diagram of a conventional autofocus algorithm is shown in FIG. 4. This algorithm uses the "hill climbing" contrast autofocus method discussed above and shown in the diagram of FIG. 5, which illustrates the relationship between the focus value obtained from the filters and the lens position. In FIG. 5, the abscissa indicates the focusing position of a lens along a distance axis, the ordinate indicates the focusing evaluation value, and the curves A and B indicate the focusing evaluation values for high and low frequency components, respectively, relative to a particular in-focus position P.

Referring to the flow diagram of FIG. 4, the best starting point for the algorithm depends on the hyperfocal distance of the current lens setting, which is a function of the focal length setting and the f-number. A distance of about 2 meters is typically a good starting point. Then the low frequency bandpass filter is loaded (stage 7) and the focus values are read out. The algorithm employs a comparison stage 8 to set the direction of lens adjustment toward increasing focus values, and to determine when the lens is stepped over the "hill". The depth of field, which depends on the present focal length and f-number, sets the number of steps, i.e., the next near focus position, which should be taken before capturing the next frame when using the low frequency bandpass filter. Once the peak of the hill is passed, the high frequency bandpass filter is loaded (stage 9), and the lens is moved in the opposite direction until the peak of the higher "hill" is found (curve A in FIG. 5). The peak focus value may use either the weighted average or peak value from numerous pixels.

Although programming the same filter for both low frequency and high frequency bandpass characteristics reduces the number of coefficient multipliers, delays, and adders by half (by using one filter instead of two), there are still a lot of components involved in these digital designs. For example, it would be customary for the circuit of FIG. 1 to use about 20,000 gates if implemented using an application specific integrated circuit (ASIC). Clearly, it is still desirable to further reduce the number of components used in a specific application. Since most of the gates are due to multipliers, it is especially desirable to reduce the number of multipliers.

SUMMARY OF THE INVENTION

The present invention is directed to overcoming one or more of the problems set forth above. Briefly summarized, according to one aspect of the present invention, a digital filter, which processes data in synchronism with a predetermined clock frequency, includes a plurality of filter coefficients that are applied to the data in groups of filter coefficients to implement a digital filter function, an arrangement of processing elements for performing a sequence of arithmetic operations upon the input data, and an output stage involving feedback to an input of the arrangement of processing elements. By applying each group of coefficients to the arrangement of processing elements in synchronism with the clock frequency, an output of the filter is obtained at a submultiple of the clock frequency.

By obtaining the output of the filter at a submultiple of the clock frequency, while using feedback through the processing elements and cycling groups of filter coefficients to the processing elements, the advantage of the invention is realized, namely, to substantially reduce the number of parts needed to implement the filter function.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

According to the invention, a special design for a multiplexed digital filter can be used in determining the degree of focus of an electronic camera having a solid-state image sensor overlaid with a color filter array of the type providing a repeatable pattern of colors. In particular, the color filter array has a color pattern including different color pixels that each repeat at a predetermined repetition rate; for instance, the color pattern may be a repeatable pattern with the luminance color recurring at a predetermined repetition rate. (The "luminance" color is typically green, or a color with a green component, such as white or cyan). An example of such an array is the "Bayer checkerboard" pattern shown in FIG. 6, and further described in U.S. Pat. No. 3,971,065 (which is incorporated herein by reference). The "Bayer" pattern color filter array contains 50% luminance (e.g. green) pixels, arranged so that every second pixel read out of the CCD is a luminance pixel. As a result, luminance recurs in a repeatable pattern at half the pixel rate.

Since the focus is ordinarily determined by filtering the luminance pixels, the digital filter only provides a new output focus value for every second pixel clock cycle. This happens because, for the "Bayer" array, there are two CCD output pixels (one for red or blue, and one for green) per green output pixel. According to the invention, the digital filter is a programmable bandpass filter that is designed such that each multiplier is used to provide two coefficient multiplications, one during the green pixel time period, and a second during the red or blue pixel time periods. This reduces by nearly a factor of two the number of gates used to implement the digital filter, e.g., on an application specific integrated circuit (ASIC).

Figure 7A:
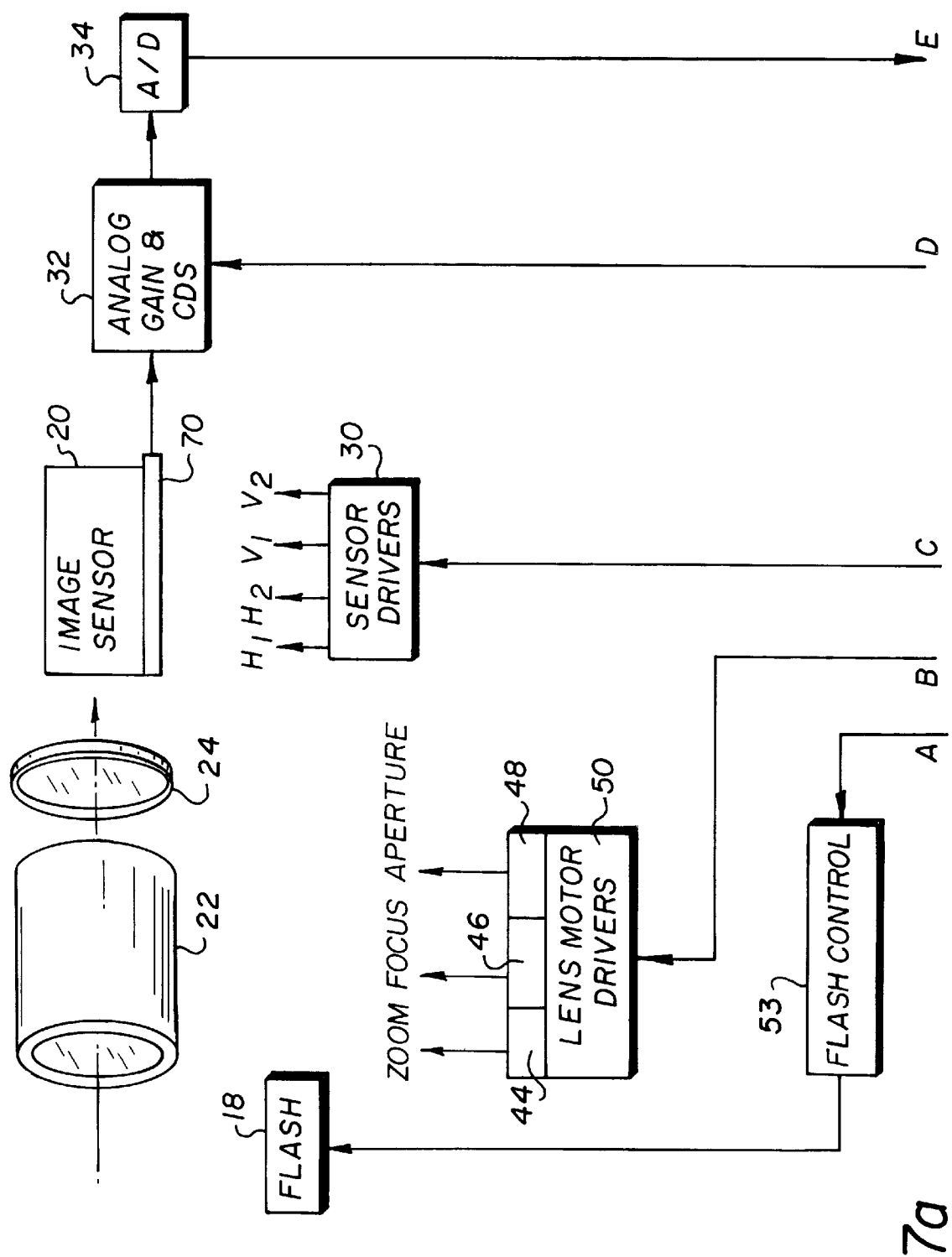
FIGS. 7a, 7b and 7c, when taken together are a block diagram of an electronic camera employing a multiplexed focus value filter according to the invention.
Figure 7B:
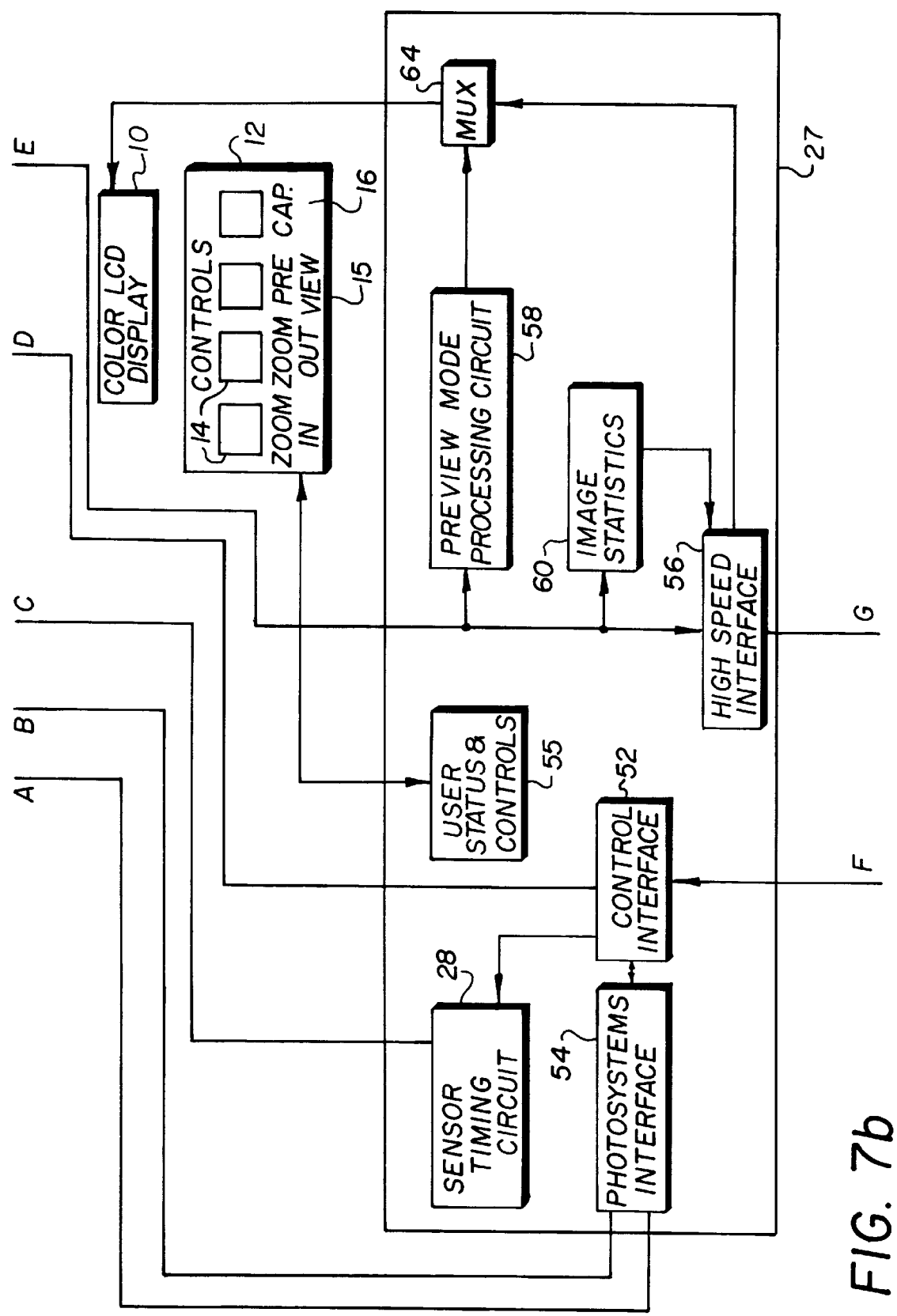

A block diagram of a camera incorporating a multiplexed focus value filter according to the invention is shown in FIGS. 7a and 7b, when taken together. The camera includes an electronic color display, for example, a color liquid crystal (LCD) display 10, and a user control section 12 having a number of user control buttons, including zoom buttons 14, a preview button 15 and a capture button 16. To take a still picture, the user turns on the camera (using a power switch (not shown), which may be automatically enabled when the user depresses the zoom buttons 14 or the preview button 15, or partially depresses the capture button 16). The user composes the picture by depressing the "zoom in" or "zoom out" buttons 14, and by adjusting the position of the camera, while observing the display image. When the user is satisfied with the composition on the color LCD display 10, the user depresses the capture button 16. The camera then captures a single still image, firing a flash 18 if necessary when the ambient illumination level is low. The still image is focused upon an image sensor 20 by a motor driven zoom lens 22. The intensity of the image light upon the sensor 20 is regulated by a motor-driven, variable, mechanical aperture 24, while exposure time is regulated electronically by appropriate clocking of the sensor 20. The still image from the image sensor 20 is processed and digitally stored on a removable memory card 26.

Control of the sensor is provided by a timing and control section 27, which is an application specific integrated circuit (ASIC) with processing and timing functions, for both capture and preview operating modes. For instance, the timing and control section 27 includes a sensor timing circuit 28 for controlling the image sensor functions. The sensor timing circuit 28 provides the signals to enable sensor drivers 30, which provide horizontal clocks (H1, H2), and vertical clocks (V1, V2). The output of the image sensor 20 is amplified and processed in an analog gain and sampling (correlated double sampling (CDS)) circuit 32, and converted to digital form in A/D converter stage 34. The A/D output signal is provided to a processor section 35, which includes a digital processor 36 and a DRAM memory 38 for temporarily storing the still images. The digital processor 36 then performs image processing on the still images, and finally stores the processed images on the removable memory card 26 via a memory card interface circuit 40, which may use the PCMCIA 2.0 standard interface. An EPROM memory 42 is used to store the firmware which operates the processor 36. The components of the processor 35 are interconnected through a data bus 43, which also connects to the timing and control section 27 and to the card interface 40.

The motor-driven zoom lens 22 includes a zoom motor 44, a focus motor 46, and an aperture motor 48 (all controlled by lens motor drivers 50). The timing and control section 27 further includes a control interface 52 connected to the lens motor drivers 50 and to a flash control circuit 53 via a photosystem interface block 54, which controls the operation of the zoom lens 22 and the flash 18. The lens zoom position is controlled by the photosystem interface block 54 based on position input from the zoom control buttons 14 through a user status and control section 55.

Figure 5:
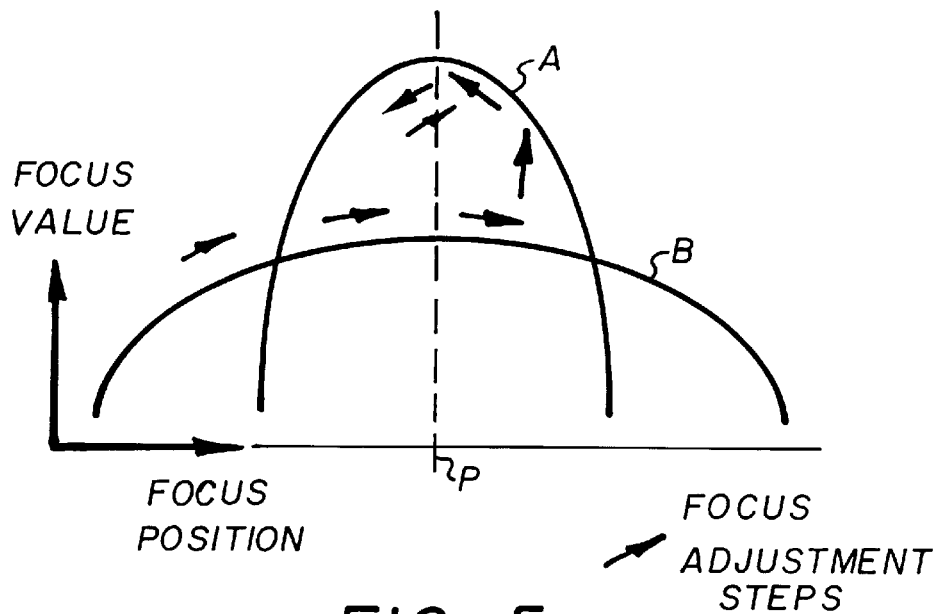
FIG. 5 shows curves for focus values derived from the algorithm described in connection with FIG. 4.
Figure 2:
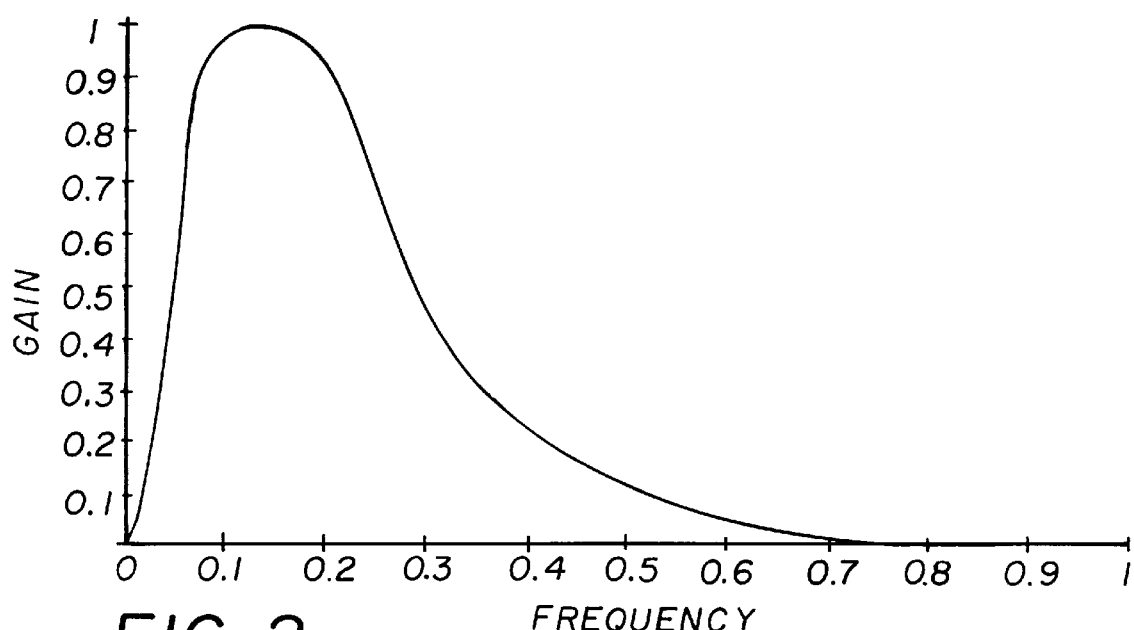
FIG. 2 is a curve showing a known low pass filter characteristic.
Figure 3:
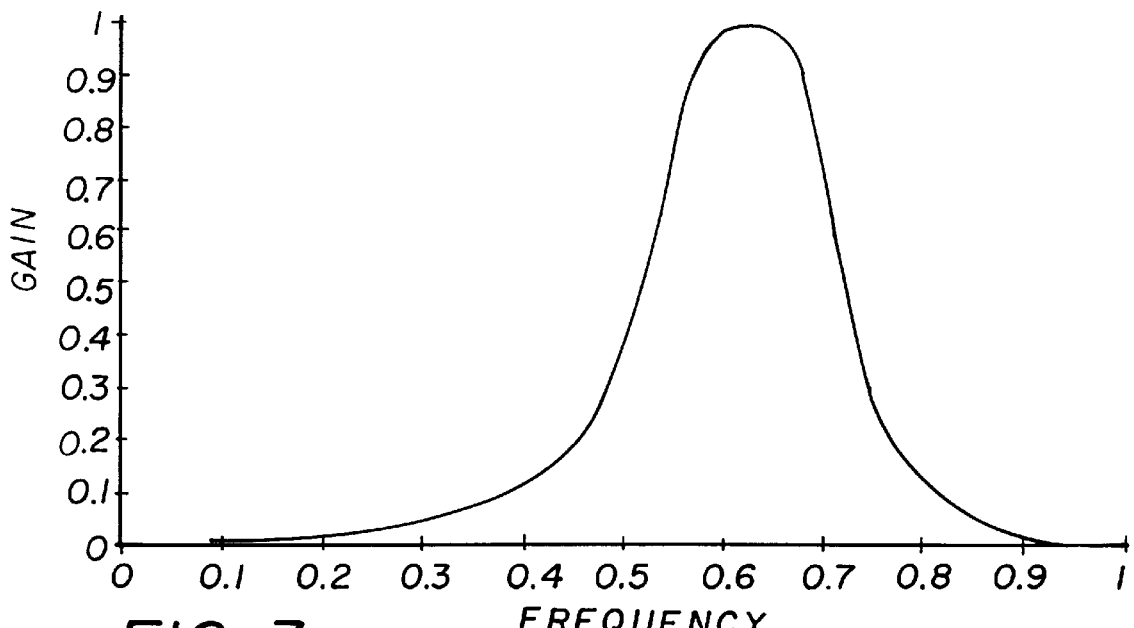
FIG. 3 is a curve showing a known high pass filter characteristic.
Figure 4:
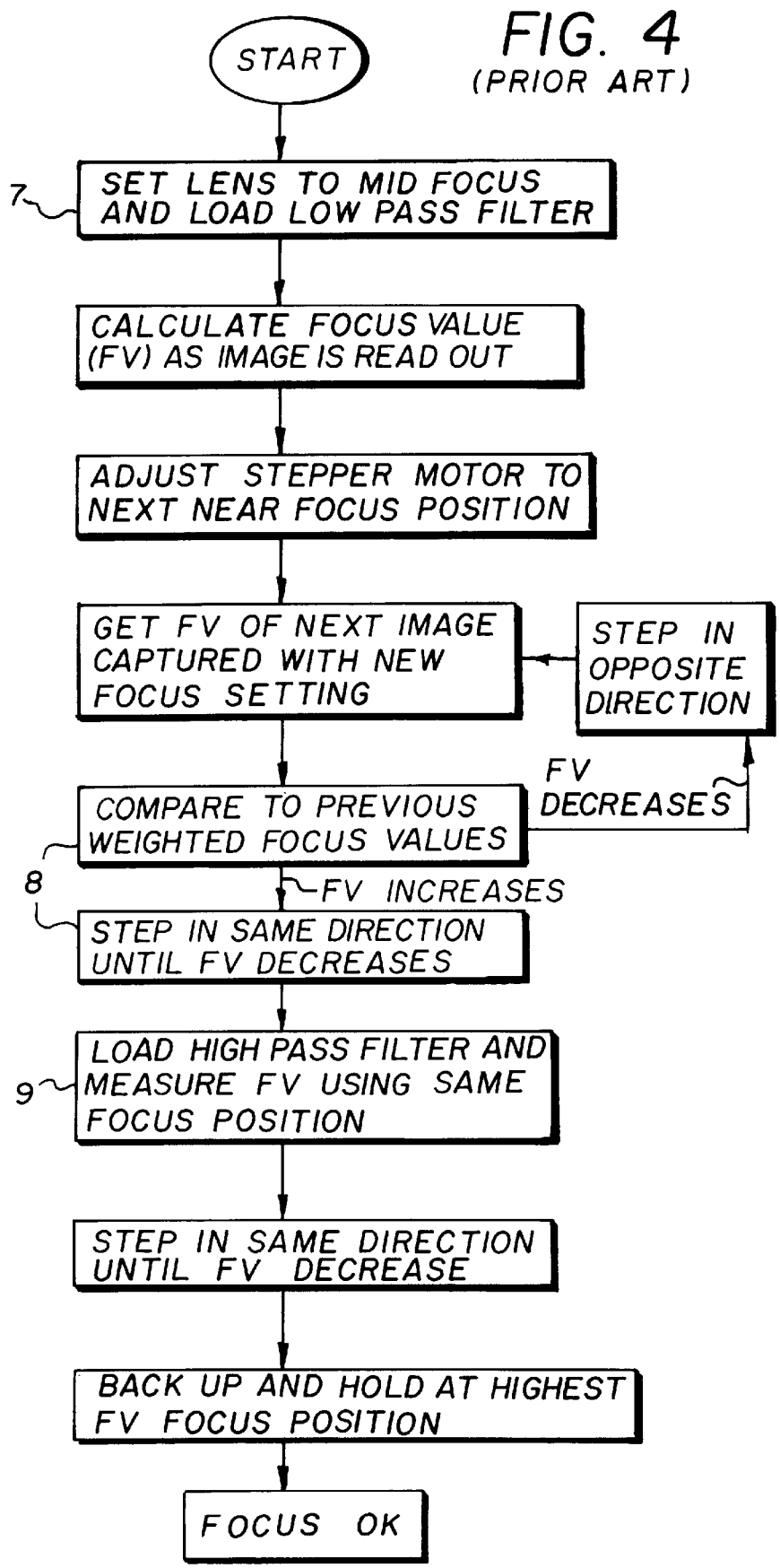
FIG. 4 is a flow chart for a known autofocus algorithm using a "hill-climbing" technique.

The focusing and exposure control are done automatically by computing "image statistics" in an image statistics processor 60 in the real-time ASIC (timing and control section 27) as preview images are continuously read out of the image sensor 20. More specifically, the image statistics processor 60 includes the digital filter configurations providing the low frequency and high frequency bandpass characteristics for the "hill climbing" autofocus technique shown in FIG. 4. These filters provide the focus values for different lens positions as shown in FIG. 5. The computed focus values are then used by a program implemented in the digital processor 36, which decides how to adjust the focus motor 46 via the control interface 52 and the photosystems interface 54 on the ASIC timing and control section 27.

Other statistics are computed in the image statistics processor 60 and used by the digital processor 36 to adjust the aperture and analog gain control via the control interface 52 and the photosystems interface 54 on the ASIC timing and control section 27. Although the digital processor 36 and the control interface 52 are shown as being within two separate sections, in some implementations the same component could be used to perform both of these functions (as well as other of the recited functions). Sensor image data is passed to the processor section 35 through a high speed interface 56 in the timing and control section 27. The sensor image data is also directed to the color LCD display 10 through a preview mode processing circuit 58.

The timing and control section (ASIC) 27 is operable in two modes, a relatively low quality "compose" mode and a much higher quality "still" mode. In the compose mode, images from the sensor 20 are processed by the image statistics processor 60 and by the preview mode processing circuit 58. The computed values are downloaded to the processor 35, where a firmware algorithm in the firmware memory 42 decides how to adjust the focus motor via the photosystem interface 54 on the ASIC. In the still mode, images from the sensor 20 are processed in the processor 35. The processor 35 is a software-driven digital processing system that is slower than the ASIC 27. The preview mode processing circuit 58 generates low resolution, spatially subsampled digital image data which can directly drive the relatively low resolution color LCD display 10. The multiplexer 64 selects image data either from the preview mode processing circuit 58, producing a preview image, or from the high speed interface 56, which allows for suitably preprocessed viewing of stored images.

Figures 6, 8:
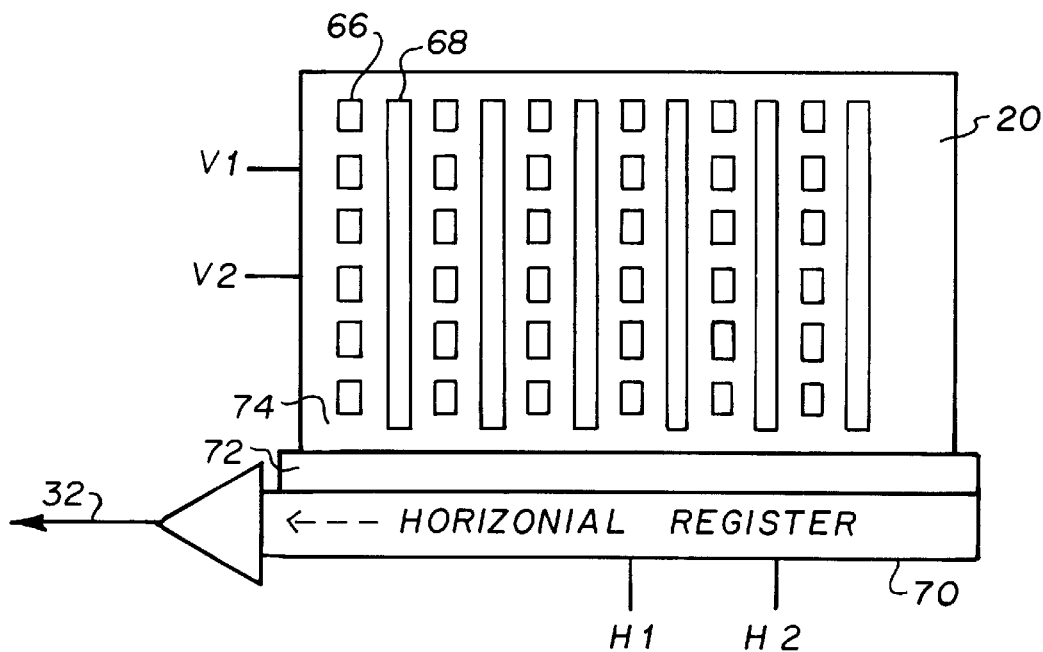
FIG. 6 is a diagram of the "Bayer checkerboard" color filter pattern for an image sensor.
FIG. 8 is a diagram of the image sensor used in the electronic camera of FIG. 7.

The sensor 20 is a progressive scan interline image sensor having a noninterlaced architecture, as shown in more detail in FIG. 8. The sensor comprises a two-dimensional array of photosites 66, e.g. photodiodes, arranged in rows and columns of image pixels, a plurality of vertical registers 68 adjacent photosite columns for transferring rows of image pixel charge from the photosites 66 to a horizontal register 70 for readout responsive to clock signals from the sensor drivers 30, and a charge drain 72 interposed between the output of the vertical registers 68 and the horizontal register 70 for eliminating complete rows of image pixels at a time from the image sensor 20. A preferred image sensor is the Kodak model CCD KAI-0400CM image sensor, which has approximately 512 active lines with approximately 768 active pixels per line and an image aspect ratio of 3:2. This sensor is described in a Performance Specification document available from Eastman Kodak Company, Rochester, N.Y. Each pixel is 9 microns "square", since both the vertical and horizontal distances between the centers of adjacent pixels are 9 microns. The sensor is overlaid with the "Bayer checkerboard" color filter array pattern which is shown in FIG. 6.

Figure 7C:
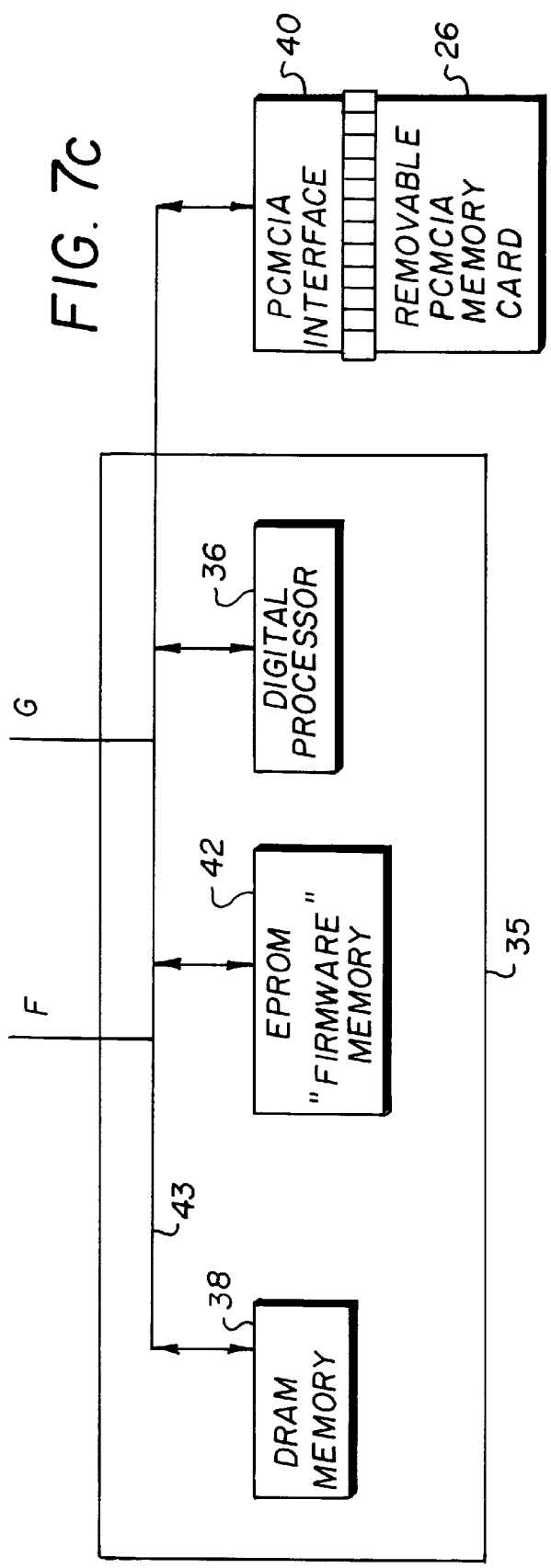

The sensor 20 uses a progressive scan readout method, which allows the entire image to be read out in a single scan. The accumulated or integrated charge for the photodiodes comprising the pixels 66 is transported from the photosites to light protected vertical (parallel) registers 68 by applying a large positive voltage to the phase-one vertical clock (V1). This reads out every row, or line, into the vertical registers 68. The image pixel charge is then transported from the vertical registers 68 to the horizontal register 70 by two-phase clocking of the vertical clocks (V1, V2). Because of the color filter array shown in FIG. 6, the image pixels on the sensor are transferred as color image pixels to the horizontal register 70, which delivers a stream of color pixel signals to the analog gain and CDS circuit 32 (see FIG. 7). The color pixel signals are subsequently converted to digital pixel signals in the A/D converter 34.

Figure 1:
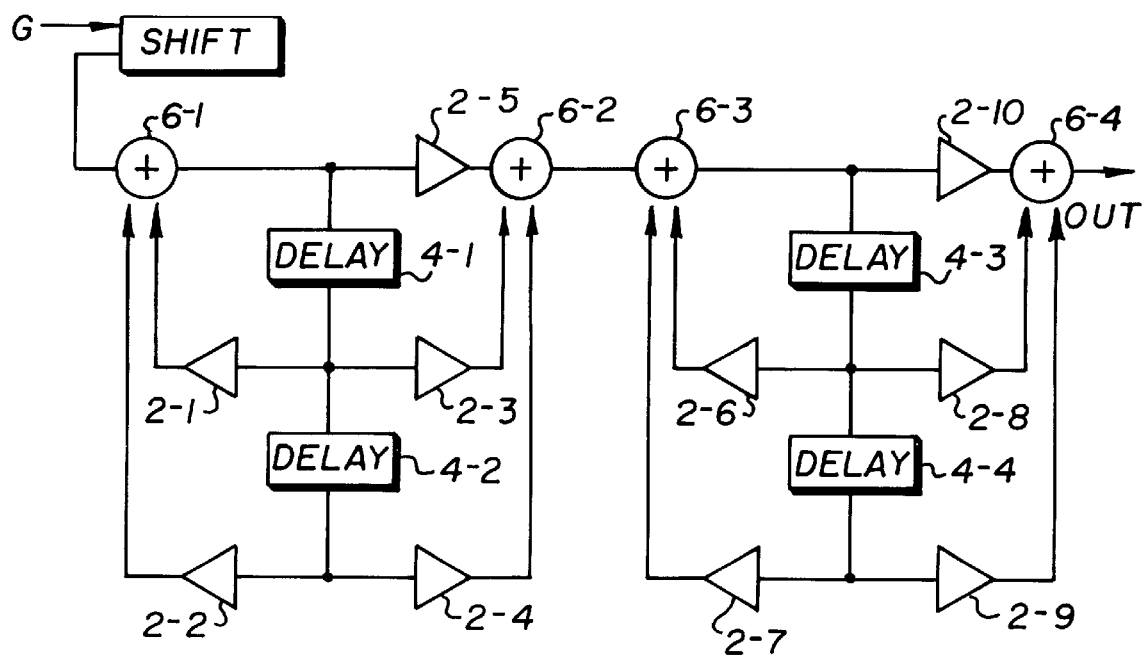
FIG. 1 is a block diagram of a conventional digital filter.

Our invention is based on the realization that a digital focus filter preferably uses only green color pixel signals from the image sensor 20 to compute the focus. Therefore, when the known digital filter of FIG. 1 is used in a camera having a Bayer filter pattern, the delays 4-1 to 4-4 should provide a two sensor pixel delay, so that all the delays output green pixel values at the same time. As a result, only every second pixel clock provides a valid output focus value. This means that half the time, the multipliers are not providing useful output signals. If, however, the signals can be routed to the multipliers properly so that they are active on each pixel clock cycle, the number of multipliers required could be reduced by a factor of 2.

Figure 9:
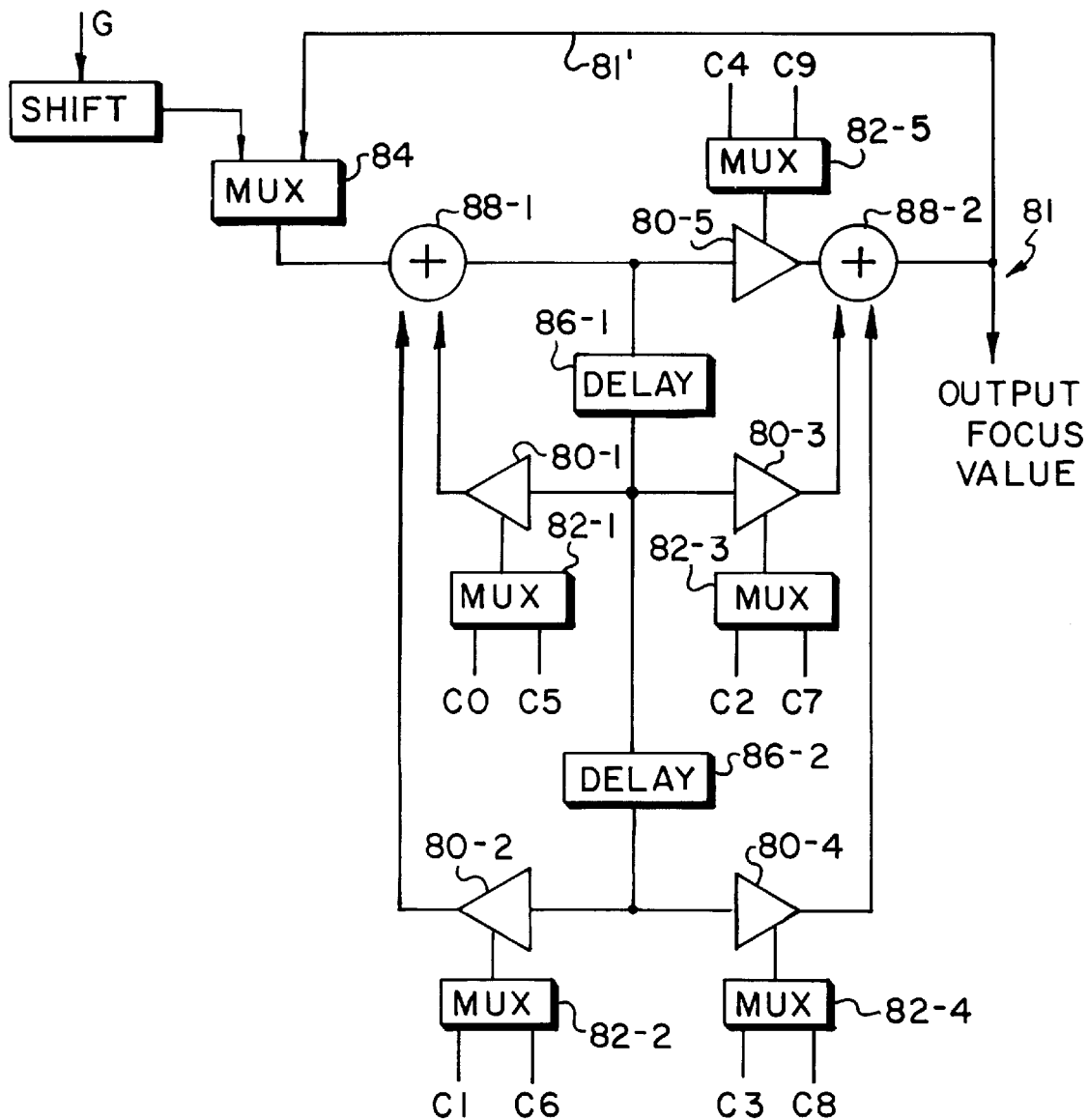
FIG. 9 is a block diagram of an embodiment of the invention.

FIG. 9 shows a block diagram of a digital filter arranged according to the invention. The filter processes data in synchronism with a predetermined clock frequency provided by the control interface 52, and according to a digital filter function involving a sequence of arithmetic operations. A plurality of filter coefficients are stored in the EPROM memory 42 and provided by the digital processor 36 to the image statistics processor 60 via the interface 52. The filter coefficients are applied to the data in groups of filter coefficients to implement the digital filter function. The sequence of arithmetic operations upon the input data are performed by an arrangement of processing elements, in this case an arrangement of multipliers 80-1 to 80-5. Furthermore, the arithmetic operations are performed in stages by applying each group of coefficients to the arrangement of processing elements in synchronism with the clock frequency, and by providing an output stage 81 involving a feedback connection 81' to an input of the arrangement of processing elements. In this manner, an output of the filter is obtained at a submultiple of the clock frequency, i.e., with two groups of coefficients cycled to the multipliers 80-1 to 80-5 at the pixel clock frequency, the filter output is obtained at one-half the pixel clock frequency. In practice, either the high frequency or the low frequency bandpass coefficients are downloaded from the EPROM memory 42 to the ASIC hardware in the processor 60 in a set of ten coefficients. Then groups of five coefficients are alternately selected from the ASIC hardware and used in the digital filter shown in FIG. 9.

This filter implements the same IIR filter function as does the filter of FIG. 1, but uses only half as many multipliers. Each multiplier 80-1 to 80-5 includes a multiplexer 82-1 to 82-5 which cycles between two coefficient values at a submultiple of the pixel clock rate. Moreover, the output signal is cycled back to an input multiplexer 84, which is also switched at a submultiple of the pixel clock rate. Consequently, the input multiplexer 84 outputs a green color pixel signal during one pixel clock cycle and then outputs a cycled-back processed signal during the other pixel clock cycle. Thus, each multiplier 80-1 to 80-5 multiplies an input color pixel signal by one coefficient during green pixel clock cycles, and multiples a second input, the cycled-back processed signal, by a second coefficient during non-green (red or blue) pixel clock cycles. Therefore, only five multipliers are required to complete the function shown in FIG. 1. They implement multiplier coefficients C0–C4 on one pixel clock cycle and implement multiplier coefficients C5–C9 on the next pixel clock cycle. The filter output changes at one-half the pixel clock rate, and therefore outputs a focus value for each input green value. Moreover, the filter shown in FIG. 9 requires only two adders 88-1 and 88-2, i.e., one-half the adders required by the known filter shown in FIG. 1.

Figure 10A:
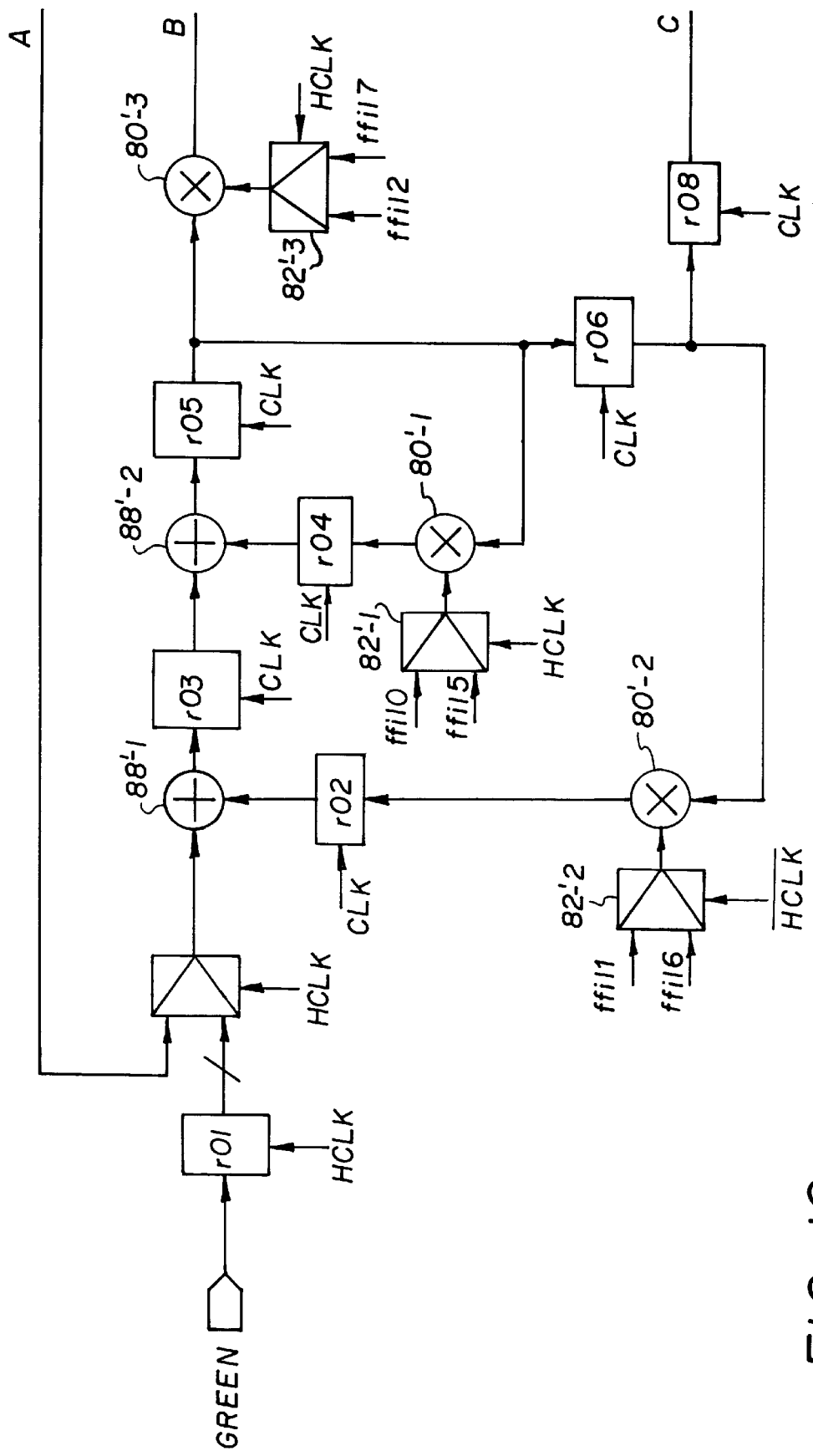
FIGS. 10a and 10b, when taken together are a diagram showing further detail of the embodiment shown in FIG. 9.
Figure 10B:
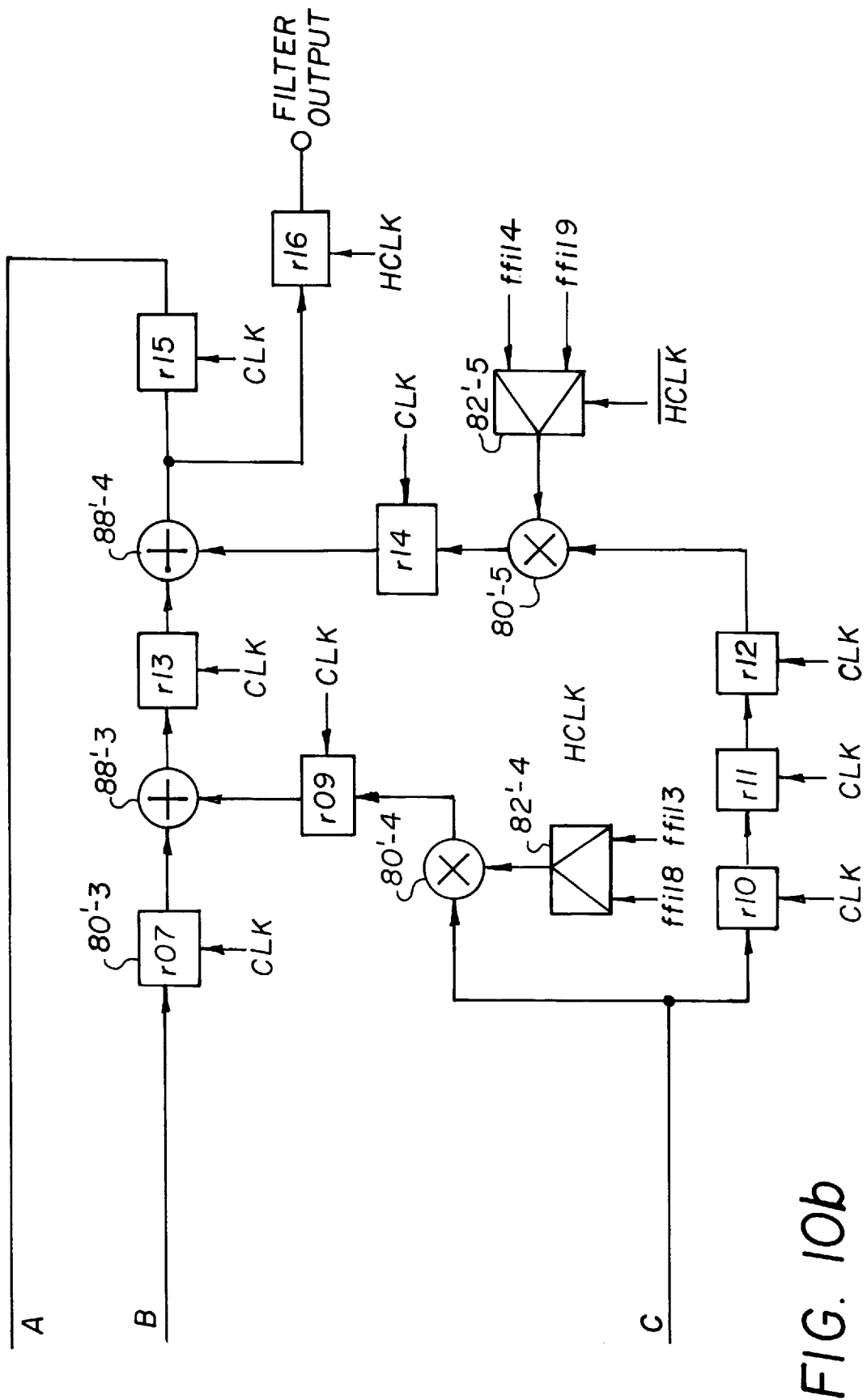

FIG. 10 shows a hardware implementation of the IIR filter shown in FIG. 9. A group of registers r02 to r16 are clocked at the pixel clock rate (CLK) to provide the pixel delays necessary for the filter. The input signals are the green color pixel signals of each line, which are input into the circuit through register r01 at the green pixel rate (HCLK), which is half the pixel clock rate (CLK). Therefore, the IIR filter outputs a new value only for every second pixel. As a result, five hardware multipliers 80'-1 to 80'-5 can be multiplexed to perform the ten multiplications. Five hardware multiplexers 82'-1 to 82'-5, which are clocked at the green pixel rate (HCLK), implement multiplier coefficients ffil0 to ffil4 on one pixel clock cycle and implement multiplier coefficients ffil5 to ffil9 on the next pixel clock cycle. Due to the architecture, four hardware adders 88'-1 to 88'-4 are employed.

Figure 11:
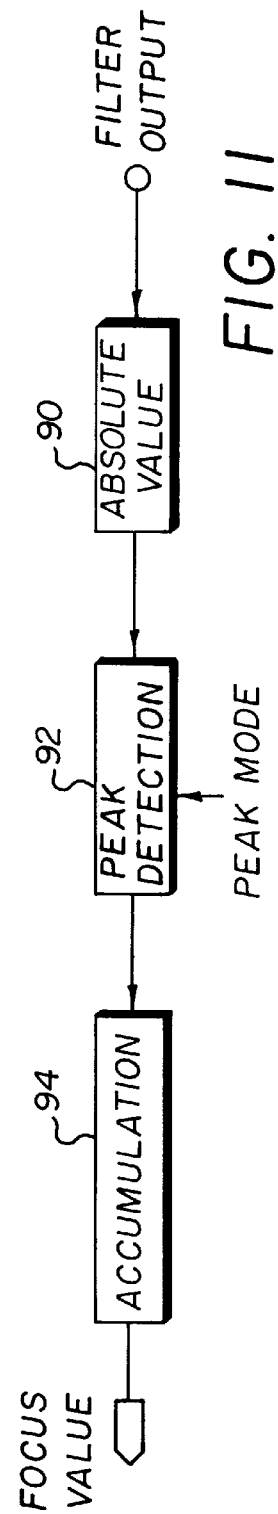
FIG. 11 is a block diagram of a circuit for generating a focus value from the filter output of FIG. 10.

In FIG. 11, the output of the filter circuit of FIG. 10 is converted into a focus value. First, the absolute value is obtained in the absolute value circuit 90. In a peak detection circuit 92, the focus value can either equal the sum of the absolute value of the filter outputs for a focus region (when peak_mode=0), or alternately can equal the sum (over all lines of the region) of the maximum absolute value signal from each line of the region (when peak_mode=1). Consequently, the absolute value of the filter output is either summed directly, or alternately is processed to detect the peak value along the line within the region. The peak or summed line region values are summed in the vertical direction in the accumulation circuit 94. The combined circuits of FIGS. 10 and 11 are estimated to require less than 10,000 gates. If all ten multipliers were used as in FIG. 1, it would require about 20,000 gates. This substantially reduces the cost of the ASIC.

The invention has been described with reference to a preferred embodiment. However, it will be appreciated that variations and modifications can be effected by a person of ordinary skill in the art without departing from the scope of the invention. For instance, while the "Bayer checkerboard" array is shown as the preferred color pattern for the image sensor, and the submultiple of the clock frequency thus becomes half the pixel clock frequency, other color patterns may be used. For instance in an "RGBRGB . . . " stripe filter, the luminance color (green) recurs for every third pixel, and the submultiple then becomes one-third of the clock frequency. It may, on occasion, also be possible to use some other color, e.g., red or blue, for calculating focus values, rather than green, and the submultiple for the other color may be different than for green.

PARTS LIST
2-1 to 2-10 multipliers
4-1 to 4-4 delay elements
6-1 to 6-4 summers
7 stage
8 comparison stage
9 stage
10 color lcd display
12 control section
14 zoom buttons
15 preview button
16 capture button
18 flash
20 progressive scan interline sensor
22 zoom lens
24 mechanical aperture
26 memory card
27 timing and control section
28 sensor timing circuit
30 sensor drivers
32 analog gain and CDS
34 A/D converter
35 processor section
36 digital image processor
38 dram memory
40 card interface
42 eprom memory
44 zoom motor
46 focus motor
48 variable aperture motor
50 lens motor drivers
52 control interface
53 flash control circuit
54 photosystems interface
55 user status and control section
56 high speed interface
58 preview mode processing circuit
60 image statistics processor
64 multiplexer
66 pixel
68 vertical readout register
70 horizontal register
72 charge drain
80-1 to 80-5 multipliers
80'-1 to 80'-5 multipliers
81 output stage
81' feedback connection
82-1 to 82-5 multipliers
82'-1 to 82'-5 multipliers
84 input multiplexer
86-1, 86-2 delays
88-1, 88-2 adders
88'-1 to 88'-4 adders

We claim:

1. A digital filter that processes input data in synchronism with a predetermined clock frequency according to a digital filter function involving a sequence of arithmetic operations, said digital filter comprising:

a plurality of filter coefficients that are applied to the input data in groups of filter coefficients to implement the digital filter function;

a plurality of multipliers for performing the sequence of arithmetic operations upon the input data, each arithmetic operation generating an output value dependent upon the value of a particular filter coefficient applied to a corresponding multiplier;

means for applying each group of coefficients to the multipliers in synchronism with the clock frequency; and an output stage providing feedback to an input of the multipliers, whereby an output of the filter is obtained at a submultiple of the clock frequency.

2. A digital filter as claimed in claim 1 wherein said means for applying each group of coefficients includes an arrangement of multiplexers for applying each group of coefficients to the multipliers, wherein each multiplexer is connected to a corresponding multiplier.

3. A digital filter as claimed in claim 1 wherein the digital filter function is a bandpass filter function including a plurality of bandpass filter coefficients that are multiplexed to the multipliers in two groups of filter coefficients at half the clock frequency, and the output of the filter is obtained at half the clock frequency.

4. A digital filter as claimed in claim 3 further including an input multiplexer driven at half the clock frequency and interposed in an input path to the multipliers, and wherein the output stage includes a feedback loop that applies the output of the filter to the input multiplexer.

5. A digital filter for use in electronic imaging apparatus having an adjustable focus lens and an image sensor having rows of photosites operating at a pixel clock frequency to provide image data, the digital filter being used to provide focus values for focusing the lens, said filter comprising:

a plurality of filter coefficients that are applied to the image data in groups of coefficients to implement a digital filter function;

an arrangement of processing elements operable at the pixel clock frequency for performing a sequence of multiplications upon the image data, each multiplication generating an output value dependent upon the value of a coefficient applied to a corresponding processing element; and means for cyclically applying the groups of coefficients to the arrangement of processing elements at a submultiple of the pixel clock frequency as the rows of photosite image data are applied to the filter, whereby the focus values output by the filter are obtained at the submultiple of the pixel clock frequency.

6. A digital filter as claimed in claim 5 wherein the arrangement of processing elements perform additions and multiplications, and wherein the arrangement of processing elements includes an arrangement of multipliers for performing the multiplications and an arrangement of adders for summing up the multiplications to form the focus values output by the filter.

7. A digital filter as claimed in claim 5 wherein said means for cyclically applying the groups of coefficients includes an arrangement of multiplexers for applying each group of coefficients to the arrangement of processing elements, wherein each multiplexer is connected to a corresponding multiplier.

8. A digital filter as claimed in claim 7 wherein the digital filter functio n is a bandpass filter function including a plurality of bandpass filter coefficients that are multiplexed to the arrangement of processing elements in two groups of filter coefficients at half the clock frequency.

9. A digital filter as claimed in claim 8 further including an input multiplexer driven at half the clock frequency and interposed in an input path to the arrangement of processing elements, and a feedback stage that applies the focus values output by the filter to the input multiplexer.

10. A digital filter as claimed in claim 5 wherein the image sensor is a color image sensor having different color pixels arranged in a repeatable color pattern in which each color recurs at a predetermined repetition rate, and wh erein th e submultiple of the pixel clock frequency is equal to the predetermined repetition rate of one of the colors.

11. A digital filter as claimed in claim 5 wherein the image sensor is a color image sensor having a repeatable color pattern in which luminance recurs at a predetermined repetition rate, and wherein the submultiple of the pixel clock frequency is equal to the luminance repetition rate.

12. Electronic imaging apparatus including an optical system and a digital filter for providing focus values for focusing the optical system, said apparatus comprising:

a color image sensor operating at a pixel clock frequency to provide image data, the color image sensor having a repeatable color pattern including different color pixels that each repeat at a predetermined repetition rate;

a plurality of filter coefficients that are applied to a subset of the image data corresponding to one of the colors in groups of coefficients to implement a digital filter function;

an arrangement of processing elements operable at the pixel clock frequency for performing a sequence of multiplications upon the image data, each multiplication generating an output value dependent upon the value of a coefficient applied to a corresponding processing element;

means for cyclically applying the groups of coefficients to the arrangement of processing elements in synchronism with the predetermined repetition rate; and an output stage involving feedback to an input of the arrangement of processing elements, whereby the focus values output by the filter are obtained at the predetermined repetition rate.

13. Apparatus as claimed in claim 12 wherein the arrangement of processing elements perform additions and multiplications, and wherein the arrangement of processing elements includes an arrangement of multipliers for performing the multiplications and an arrangement of adders for summing up the multiplications to form the output of the filter.

14. Apparatus as claimed in claim 12 wherein said means for cyclically applying the groups of coefficients includes an arrangement of multiplexers for applying each group of coefficients to the arrangement of processing elements, wherein each multiplexer is connected to a corresponding multiplier.

15. Apparatus as claimed in claim 14 wherein the digital filter function is a bandpass filter function including a plurality of bandpass filter coefficients that are multiplexed to the arrangement of processing elements in two groups of filter coefficients at the predetermined repetition rate.

16. Apparatus as claimed in claim 15 wherein the output stage includes a feedback loop that applies the focus values output by the filter to the input of the arrangement of processing elements through an input multiplexer that is driven at the predetermined repetition rate.

17. Apparatus as claimed in claim 12 in which the repeatable color pattern of the color image sensor includes a repeatable luminance pattern in which a luminance color pixel recurs at the predetermined repetition rate.

18. Apparatus as claimed in claim 17 in which every other color pixel is a luminance pixel, such that the predetermined repetition rate is half the pixel clock frequency.

19. A digital filter for transforming an input sequence of digital signals into an output sequence of filtered digital signals according to a computational algorithm applied in a plurality of arithmetic stages in synchronism with an input clock frequency, said filter comprising:

a memory for storing at least two groups of coefficients that together characterize the computational algorithm;

a plurality of multipliers responsive to coefficients applied to respective coefficient inputs thereof and to the input sequence of digital signals for generating the products of a digital input signal and the respective coefficients, said multipliers having an input for receiving the sequence of digital signals and an output for providing a sequence of filtered signals;

a multiplexing arrangement for cyclically routing each group of coefficients to the coefficient inputs of the multipliers such that different coefficients are used for each consecutive multiplication; and a feedback stage for applying the output of the multipliers to the input of said multipliers, whereby an output filtered according to the computational algorithm is provided at a submultiple of the input clock frequency.

* * * * *

UNITED STATES PATENT AND TRADEMARK OFFICE
CERTIFICATE OF CORRECTION

PATENT NO. : 5,874,994
DATED : February 23, 1999
INVENTOR(S) : Don X. Xie, et al It is certified that error appears in the above-identified patent and that said Letters Patent is hereby corrected as shown below:

On the title page, item [54]:

-- SYNCHRONIZED DIGITAL FILTER EMPLOYING ARITHMETIC OPERATIONS FOR AN ELECTRONIC CAMERA" --

Signed and Sealed this

Sixth Day of July, 1999

Attest:

Q. TODD DICKINSON

*Attesting Officer*          *Acting Commissioner of Patents and Trademarks*

UNITED STATES PATENT AND TRADEMARK OFFICE
CERTIFICATE OF CORRECTION

Page 1 of 1

| | |
|---|---|
| PATENT NO. | : 5,874,994 |
| APPLICATION NO. | : 08/568882 |
| DATED | : February 23, 1999 |
| INVENTOR(S) | : Don X. Xie and Kenneth A. Parulski |

It is certified that error appears in the above-identified patent and that said Letters Patent is hereby corrected as shown below:

ON THE TITLE PAGE

Insert the following priority claim on the face of the Patent after item (22):

-- Related U.S. Application Data

(60)    Provisional application No. 60/000,753, filed on June 30, 1995. --

Signed and Sealed this
Eighth Day of July, 2014

Michelle K. Lee
*Deputy Director of the United States Patent and Trademark Office*